US008973911B2

(12) United States Patent
Lin et al.

(10) Patent No.: US 8,973,911 B2
(45) Date of Patent: Mar. 10, 2015

(54) MOVABLE JAW QUICK RELEASE APPARATUS OF A VICE

(75) Inventors: Chang Yi Lin, Taichung (TW); Chia-Chun Hsu, Tainan (TW); Chang-Chih Lin, Taichung (TW)

(73) Assignee: Auto Well Enter. Co., Ltd., Taichung (TW)

( * ) Notice: Subject to any disclaimer, the term of this patent is extended or adjusted under 35 U.S.C. 154(b) by 223 days.

(21) Appl. No.: 13/592,920

(22) Filed: Aug. 23, 2012

(65) Prior Publication Data

US 2014/0021671 A1 Jan. 23, 2014

(30) Foreign Application Priority Data

Jul. 20, 2012 (TW) ............................ 101126208 A

(51) Int. Cl.

| | |
|---|---|
| ***B25B 1/10*** | (2006.01) |
| ***B25B 5/10*** | (2006.01) |
| ***B25B 1/24*** | (2006.01) |
| ***B25B 5/16*** | (2006.01) |
| ***B23Q 3/02*** | (2006.01) |
| ***B23P 19/04*** | (2006.01) |

(52) U.S. Cl.

USPC ........... 269/257; 269/240; 269/247; 269/136; 29/263

(58) Field of Classification Search

USPC ........... 269/257, 240, 247, 136, 3, 43; 29/563
See application file for complete search history.

(56) References Cited

U.S. PATENT DOCUMENTS

| | | | | |
|---|---|---|---|---|
| 605,106 | A * | 6/1898 | Lewis | 269/247 |
| 690,311 | A * | 12/1901 | McDowell | 269/247 |
| 1,452,847 | A * | 4/1923 | Quinlan | 269/247 |
| 2,429,801 | A * | 10/1947 | Butler | 269/240 |
| 3,223,407 | A * | 12/1965 | Wills | 269/240 |
| 4,295,641 | A * | 10/1981 | Boucher | 269/136 |
| 6,206,354 | B1 * | 3/2001 | Lin | 269/43 |
| 7,036,807 | B1 * | 5/2006 | Gasparyan et al. | 269/181 |
| 8,167,289 | B2 * | 5/2012 | Schar | 269/25 |
| 8,646,765 | B2 * | 2/2014 | Caldarone | 269/111 |
| 2010/0230884 | A1 * | 9/2010 | Nelson | 269/265 |

FOREIGN PATENT DOCUMENTS

FR 2530994 A1 * 2/1984 ................ B25B 1/10

* cited by examiner

*Primary Examiner* — Alvin Grant

(57) ABSTRACT

A movable jaw quick release apparatus of a vice comprises a tooth base, a movable jaw and two restriction elements. The tooth base is formed with two inclined guide grooves, each of which has a first inclined surface, a second inclined surface and a bottom surface. The left and the right side surfaces of the movable jaw are formed with a through hole respectively. Each restriction element penetrates one of the through holes and moves between a first position and a second position along one of the inclined guide groove As the movable jaw generates vibration forces, each restriction element transfers the vibration forces to the tooth base, therefore, the movable jaw do not move upwardly and shake toward a work piece and reduce its clamping force for the work piece.

8 Claims, 5 Drawing Sheets

MOVABLE JAW QUICK RELEASE APPARATUS OF A VICE

BACKGROUND OF THE INVENTION

1. Field of the Invention

The present invention relates to a movable jaw quick release apparatus of a vice for quickly detaching a movable jaw of a vice.

2. Description of the Prior Art

When a machining center is processing to a normal part or work piece by cutting processing, the part or work piece is clamped and positioned by a movable jaw and a fixed jaw of a vice. The part or the work piece is vibrated violently as the part or the work piece is processed by the machining center. If the movable jaw isn't fixed on a tooth base firmly, the movable jaw would move upwardly. The part or the work piece is lifted up by the movable jaw, even flies out from the vice. It influences the processing precision of the part or the work piece and is very dangerous. As a result, the vice includes a bolt and a positioning pin. The bolt penetrates the movable jaw and the tooth base. The positioning pin penetrates the movable jaw and is engaged in the tooth base, such that the movable jaw and the tooth base are fixed together. Consequently, the movable jaw does not shake with respect to the tooth base as it clamps the part or the work piece.

However, the bolt and the positioning pin have to be removed first, and then the movable jaw is able to be detached from the tooth base. The disassembly action is inconvenient to be operated. Besides, many vices can be arranged side by side for cutting processing. After finishing the cutting processing, users have to consume much time and energy for removing each vice away to create some space for disassembling the movable jaw from the tooth base.

The present invention is, therefore, arisen to obviate or at least mitigate the above mentioned disadvantages.

SUMMARY OF THE INVENTION

The main object of the present invention is to provide a movable jaw quick release apparatus of a vice. It is able to detach and assemble a movable jaw to a tooth base without removing a restriction element and a positioning mechanism.

To achieve the above and other objects, the movable jaw quick release apparatus of a vice of the present invention comprises a tooth base, a movable jaw and at least a restriction element.

The tooth base comprises a top surface and a bottom surface. The tooth base is formed with at least an inclined guide groove extending from the top surface of the tooth base downwardly and inclinedly. The inclined guide groove has a first inclined surface, a second inclined surface and a bottom surface. The bottom surface of the inclined guide groove is located between the first and the second inclined surfaces.

The movable jaw comprises a top wall and a plurality of side walls. The top wall and the side walls define a tooth base receiving space. The tooth base is received in the tooth base receiving space.

Wherein the side walls comprises a left side wall and a right side wall. At least one of the left and the right side walls is formed with a through hole in communication with the tooth base receiving space.

The restriction element penetrates the through hole and moves between a first position and a second position along the inclined guide groove. The restriction element is received in the inclined guide groove and abuts against the first and the second inclined surfaces and the bottom surface when the restriction element is located in the first position so that the movable jaw is fixed on the tooth base. The restriction element is away from the inclined guide groove when the restriction element is located in the second position so that the movable jaw is removed from the tooth base.

As the movable jaw generates a forward vibration force, a backward vibration force, an upward vibration force and a downward vibration force, the restriction element transfers the vibration forces to the tooth base. Especially the first inclined surface absorbs the upward vibration force to prevent the movable jaw from moving upwardly. The second inclined surface absorbs the forward vibration force to prevent the movable jaw from shaking toward a work piece and reducing its clamping force for the work piece.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
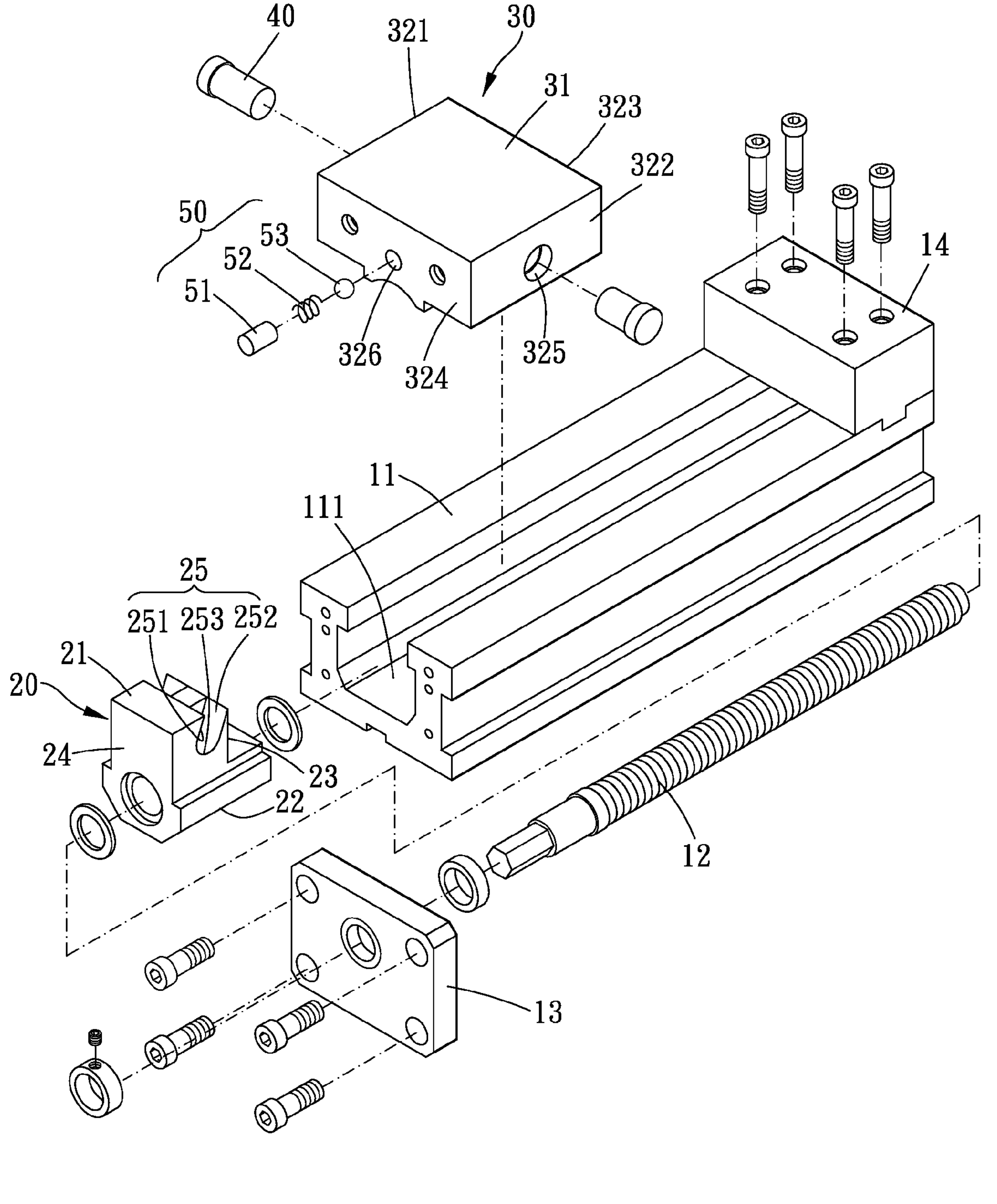
FIG. 1 is a breakdown drawing showing a preferred embodiment of the present invention.
Figure 2:
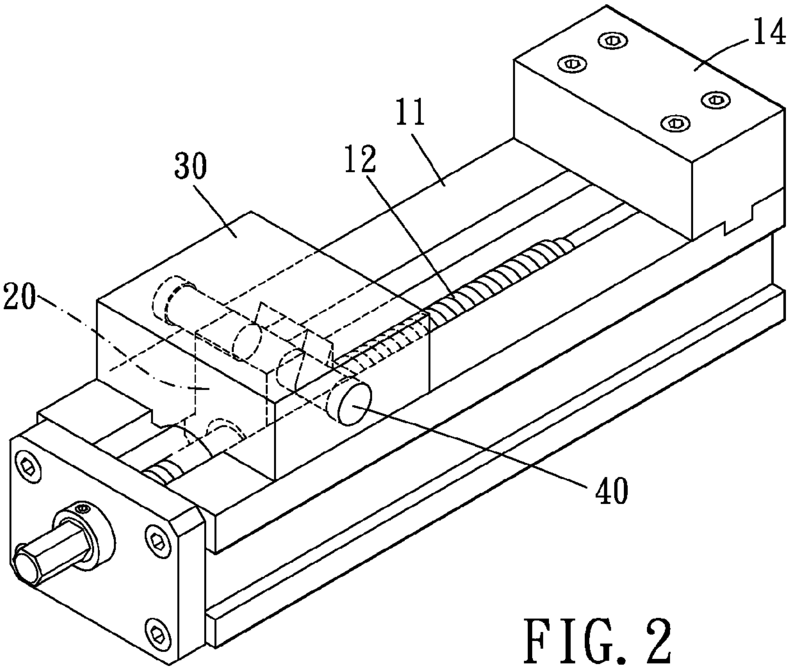
FIG. 2 is a stereogram showing a preferred embodiment of the present invention.
Figure 3:
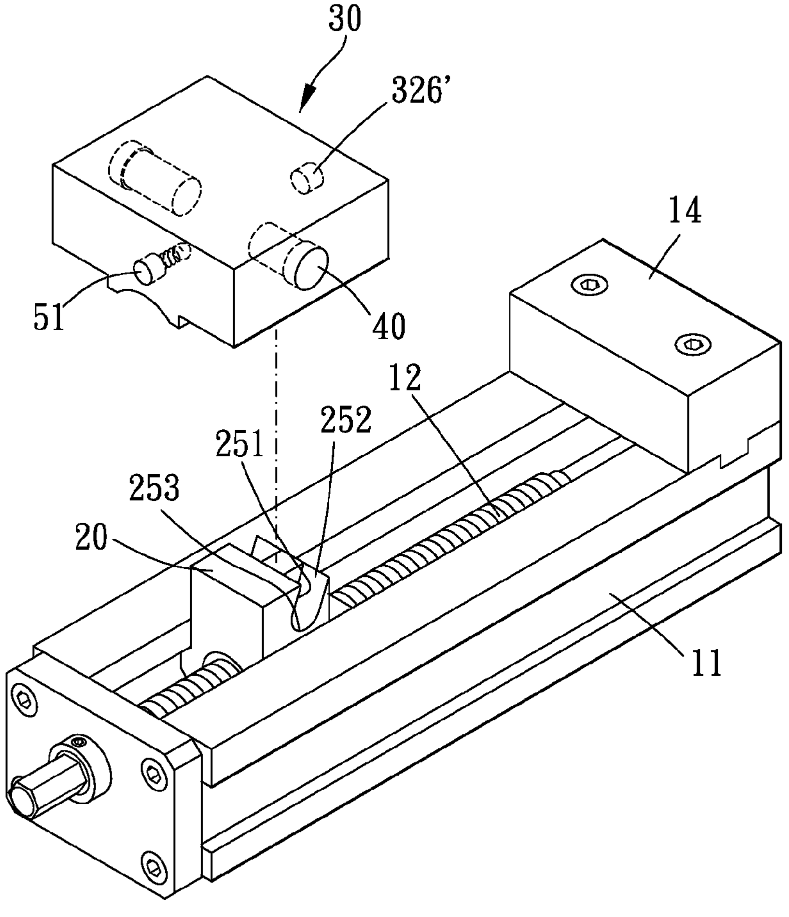
FIG. 3 is a schematic drawing of a preferred embodiment of the present invention showing a movable jaw fixed on a tooth base.

Please refer to FIG. 1 to FIG. 3 for a preferred embodiment of the present invention. The movable jaw quick release apparatus of a vice of the present embodiment is mounted on a vice. The vice includes a main body 11, a guide screw 12, a screw fixed block 13, a fixed jaw 14 and a plurality of clamp block (not shown). The main body 11 has a sliding recess 111. The guide screw 12 is disposed in the sliding recess 111, and one end of the guide screw 12 goes through the screw fixed block 13. The fixed jaw 14 is disposed on the main body 11, preferably the fixed jaw is detachable, as shown in FIG. 1. In other embodiments, the fixed jaw 14 is integrally disposed on the main body 11 so that the fixed jaw 14 is non-detachable. Wherein at least one clamp block is detachably disposed on the fixed jaw 14. The movable jaw quick release apparatus of a vice comprises a tooth base 20, a movable jaw 30, two restriction elements 40 and a positioning mechanism 50.

The tooth base 20 is disposed in the sliding recess 111 and the guide screw 12 penetrates therethrough. The tooth base 20 is able to be slid in the sliding recess 111 by the guide screw 12. The tooth base 20 comprises a top surface 21, a bottom surface 22, a front side surface 23 and a back side surface 24. The tooth base 20 is formed with two inclined guide grooves 25 respectively extending from the top surface 21 of the tooth base 20 downwardly and inclinedly. Each inclined guide groove 25 has a first inclined surface 251, a second inclined surface 252 and a bottom surface 253. The bottom surface 253 of the inclined guide groove 25 is located between the first and the second inclined surfaces 251, 252. More definitely, each inclined guide groove 25 extends inclinedly toward the bottom surface 22 and the back side surface 24 of the tooth base 20. The bottom surface 253 of each inclined guide groove 25 is closer to the back side surface 24 of the tooth base 20. In other embodiment, each inclined guide groove 25 also extends inclinedly toward the bottom surface 22 and the front side surface 24 of the tooth base 20. In this way, the bottom surface 253 of each inclined guide groove 25 is closer to the front side surface 23 of the tooth base 20. Preferably, the bottom surface 253 of each inclined guide groove 25 is a concave arc surface so that an inner contour of each inclined guide groove 25 is U-shaped. In other embodiments, each inclined guide groove is L-shaped (not shown). More specifically, each inclined guide groove 25 defines a first section and a second section (not shown). The first section extends from the top surface of the tooth base 20 downwardly and inclinedly, and the second section extends from a bottom end of the first section downwardly and inclinedly. A corner between the first and the second sections is a right angle so that the inclined guide groove is L-shaped. In other embodiments, each inclined guide groove 25 is V-shaped. More clearly, the corner between the first and the second sections is an obtuse or acute angle so that the inclined guide groove is V-shaped.

Figure 4:
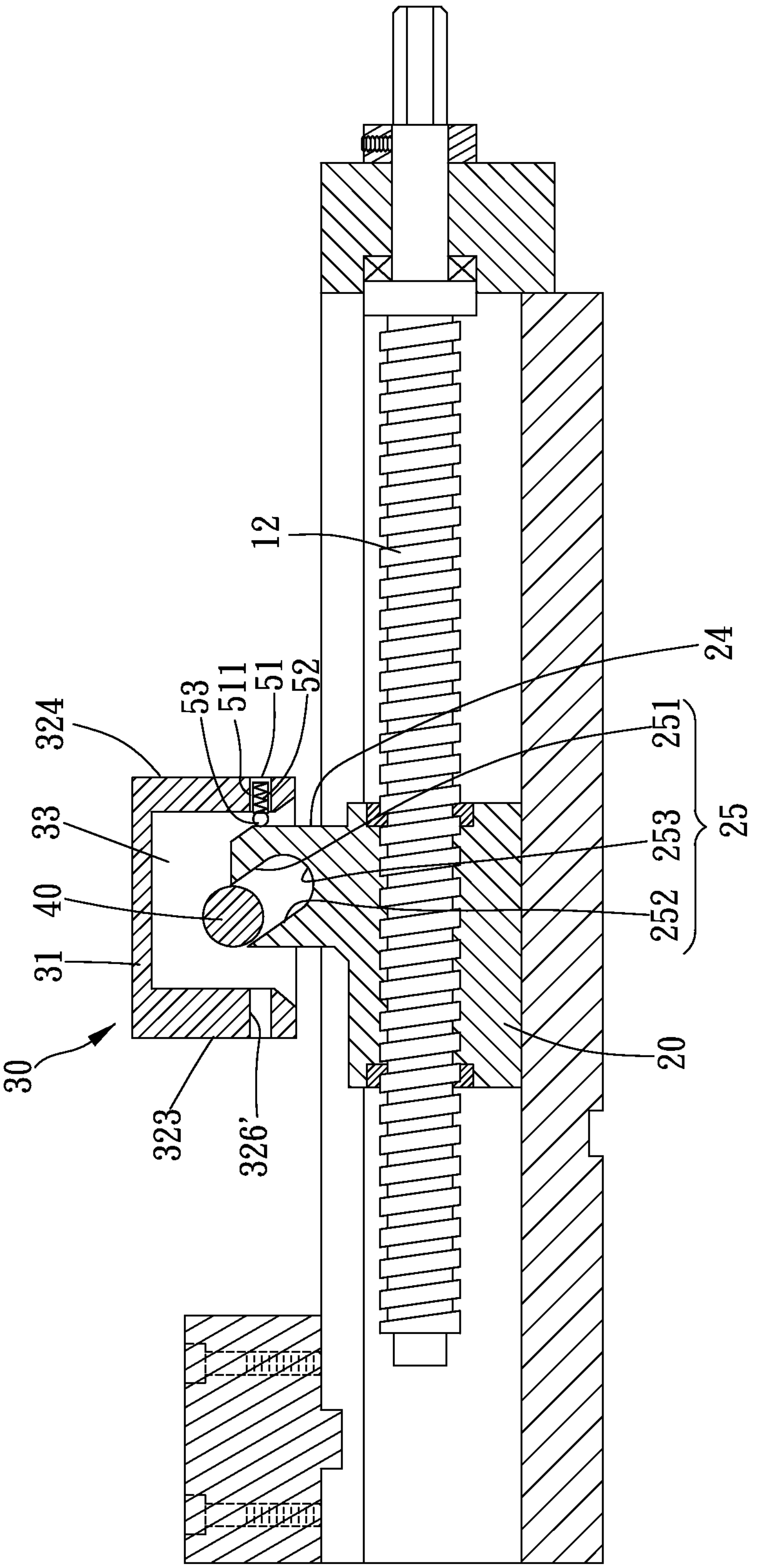
FIG. 4 is a side cross-sectional view of a preferred embodiment of the present invention showing a restriction element located in a second position.

The movable jaw 30 comprises a top wall 31 and a plurality of side walls. The top wall 31 and the side walls define a tooth base receiving space 33, as shown in FIG. 4. Preferably, the movable jaw 30 is a rectangular block so that the side walls include a left side wall 321, a right side wall 322, a front side wall 323 and a back side wall 324. The left and the right side walls 321, 322 are respectively formed with a through hole 325. The through holes 325 individually communicate with the tooth base receiving space 33. The back side wall 324 is formed with a through hole 326 in communication with the tooth base receiving space 33. The clamp block is respectively and detachably disposed at the front and the back side walls 323, 324 of the movable jaw 30.

The restriction elements 40 individually penetrate through one of the through holes 325 of the left and right side walls 321, 322 and move between a first position and a second position along the inclined guide grooves 25. Preferably, the restriction elements 40 may be, but not limited to, rod-shaped or polygonal.

The positioning mechanism 50 comprises a fixed member 51, a resilient member 52 and a ball 53. The fixed member 51 penetrates the through hole 326 and is formed with a receiving groove 511, as shown in FIG. 4. The resilient member 52 is received in the receiving groove 511. The ball 53 is disposed at one end of the resilient member 52 and tends to moves toward the front side wall 323 of the movable jaw 30.

Figure 5:
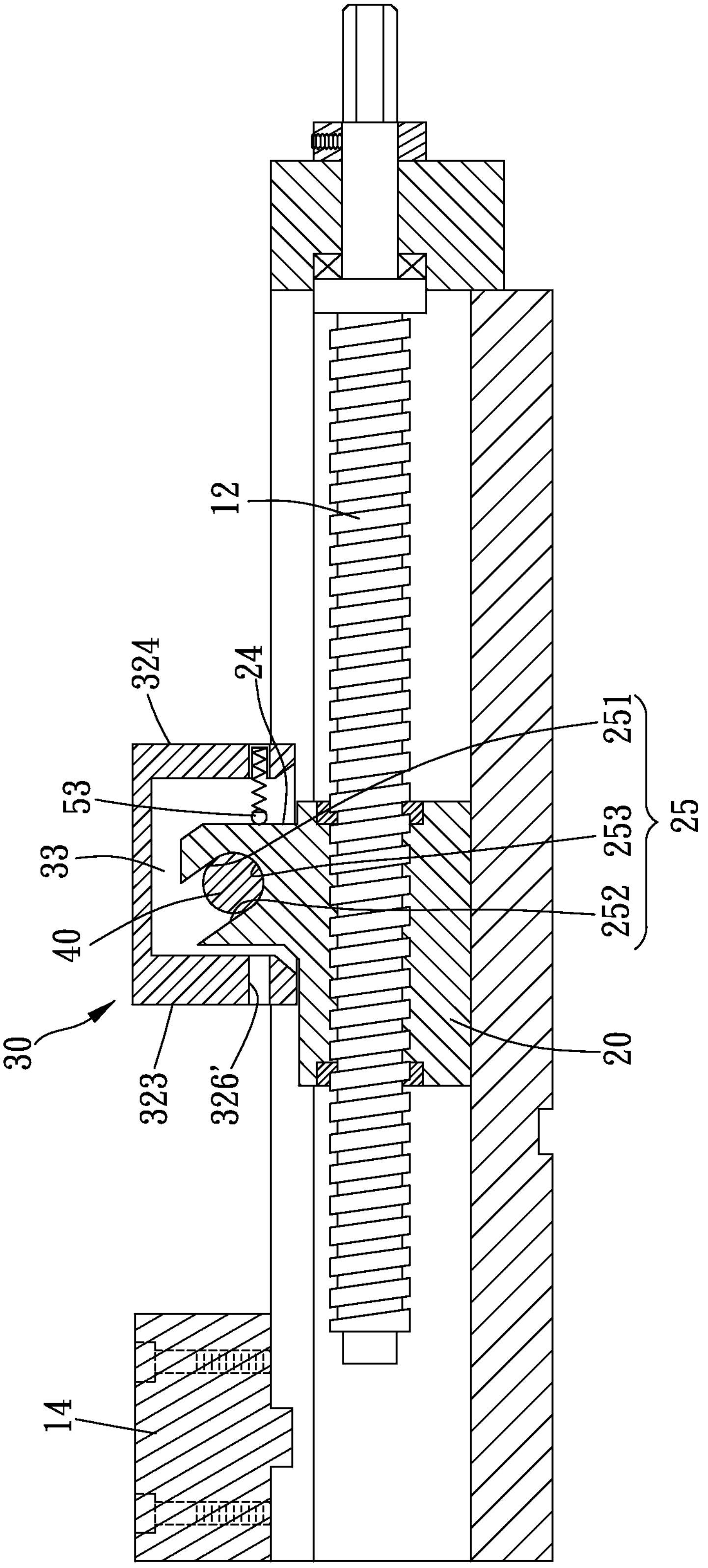
FIG. 5 is a side cross-sectional view of a preferred embodiment of the present invention showing a restriction element located in a first position.

In the present embodiment, while the movable jaw 30 is mounted on the tooth base 20, each of restriction elements 40 slides from an open end of one of the inclined guide grooves 25 to the bottom surface 253 of one of the inclined guide grooves 25 along the first and the second inclined surfaces 251, 252. When each restriction element 40 is located in the open end of one of the inclined guide grooves 25, each restriction element is located in the second position too. The ball 53 of the positioning mechanism 50 abuts to the back side surface 24 of the tooth base 20, as shown in FIG. 4. When each restriction element 40 is located in the bottom surface 253 of one of the inclined guide grooves 25, each restriction element 40 is located in the first position too. Each restriction element 40 is received in one of the inclined guide grooves 25 and abuts to the first and the second inclined surfaces 251, 252 and the bottom surface 253 so that the movable jaw 30 is fixed on the tooth base 20. The tooth base 20 is received in the tooth base receiving space 33. The ball 53 of the positioning mechanism 50 still abuts to the back side surface 24 of the tooth base 20, as shown in FIG. 5. The tooth base 20 is able to take the movable jaw 30 close to or away from the fixed jaw 14, whereby the movable jaw 30 and the fixed jaw 14 clamp or release a work piece.

If users would like to remove the movable jaw from the tooth base 20, each restriction element slides from the bottom surface 253 of one of the inclined guide grooves 25 to the open end of one of the inclined guide grooves 25. When each of restriction elements 40 slides to the open end of one of the inclined guide grooves 25, each of restriction elements 40 is located in the second position and away from one of the inclined guide grooves 25. At the present time, users can move the movable jaw 30 upward so that the movable jaw 30 is removed from the tooth base 20, as shown in FIG. 4.

As such, the movable jaw quick release apparatus of a vice of the present invention need not pull the restriction elements 40 out from the through holes 325 and the positioning mechanism 50 need not be removed from the through hole 326 so that the movable jaw 30 is able to be mounted on the tooth base 20 and removed from the tooth base 20. It is quite convenient and practical. If many vices are arranged side by side for cutting processing, users do not need to move each vice away to create some space for disassembling the movable jaw from the tooth base, so that users save much energy and time for moving the vices.

Secondly, in the preferred embodiment, the inner contours of the inclined guide grooves 25 are U-shaped such that the restriction elements 40 are easy to slide in the inclined guide grooves 25. When the movable jaw 30 is fixed on the tooth base 20, each restriction element 40 is received in one of the inclined guide grooves 25 and abuts against the first and the second inclined surfaces 251, 252 and the bottom surface 253 of one of the inclined guide grooves 25. More specifically, a front side, a back side, an upper side and a lower side of each restriction element 40 respectively abut to the first and the second inclined surfaces 251, 252 and the bottom surface 253 of one of the inclined guide grooves 25. As the movable jaw 30 generates a forward vibration force, a backward vibration force, an upward vibration force and a downward vibration force, each restriction element 40 transfers the vibration forces to the tooth base 20. Especially the first inclined surface 251 absorbs the upward vibration force to prevent the movable jaw 30 from moving upwardly. The second inclined surface 252 absorbs the forward vibration force to prevent the movable jaw 30 from shaking toward the work piece and reducing its clamping force for the work piece, especially the positioning mechanism 50 comprises the resilient member 53.

Moreover, if users would like to substitute a new clamp block for an old one, they can remove the movable jaw 30 from the tooth base 20 first, and then rotate the movable jaw 30 180 degrees, therefore the clamp block mounted on the back side wall 324 of the movable jaw 30 faces to the fixed jaw 14. Finally, the movable jaw 30 is fixed on the tooth base 20 by the installation means said above. At the present time, the ball 53 of the positioning mechanism 50 abuts to the front side 23 of the tooth base 20. Therefore, the movable jaw quick release apparatus of a vice of the present invention do not need to detach the clamp blocks from the front and the back side walls of the movable jaw 30 so that the clamp blocks can change to each other direct.

Figure 6:
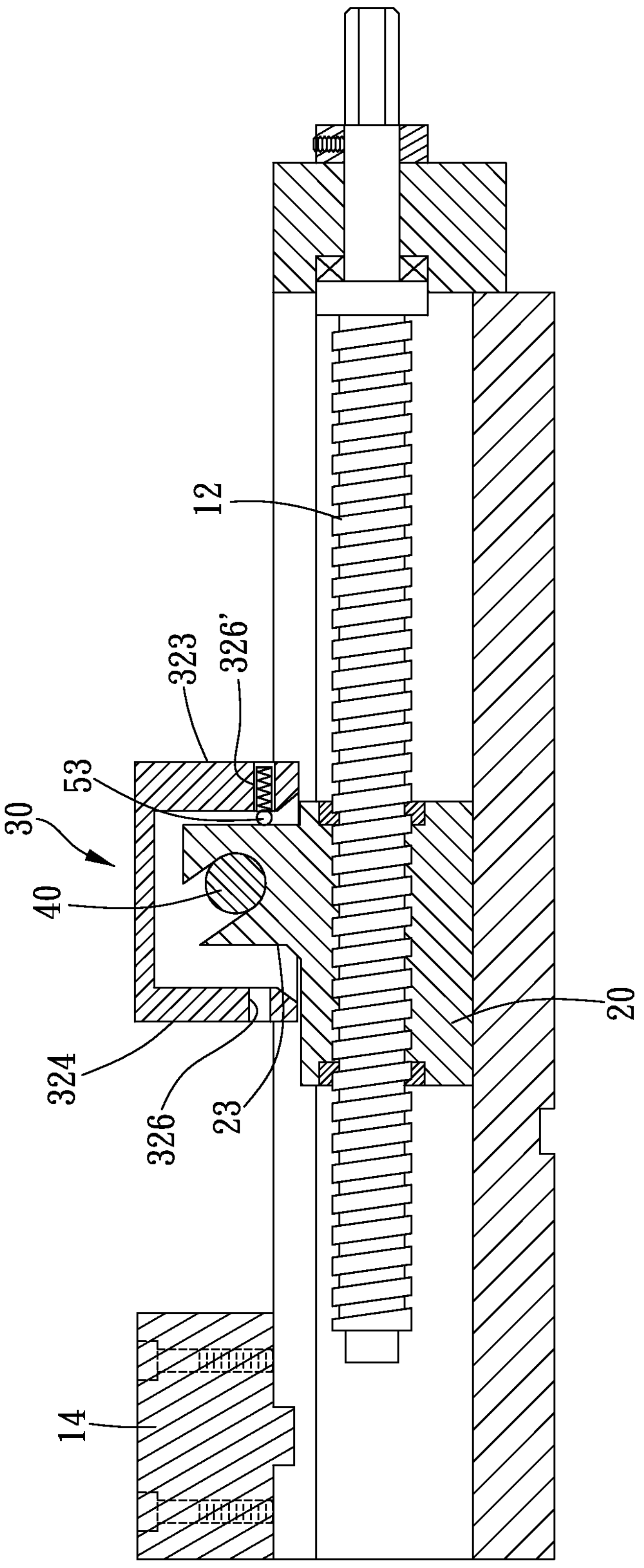
FIG. 6 is a schematic drawing of a preferred embodiment of the present invention showing a movable jaw rotated 180 degrees.

Additionally, please refer to FIG. 6, the front and the back side walls 323, 324 of the movable jaw 30 changeably clamp the work piece without the clamp blocks. When the front side wall 323 of the movable jaw is abraded severely, users have to rotate the movable jaw 180 degrees, therefore, the back side wall 324 of the movable jaw 30 faces to the fixed jaw 14. And the movable jaw 30 is fixed on the tooth base 20. Finally, take out the positioning mechanism 50 from the through hole 326 and put the positioning mechanism 50 into another through hole 326'. The ball 53 of the positioning mechanism 50 abuts to the back side surface 24 of the tooth base 20. As a result, the back side wall 324 of the movable jaw 30 replaces the front side wall 323 of the movable jaw 30 for clamping the work piece.

What is claimed is:

1. A movable jaw quick release apparatus of a vice, comprising:

a tooth base, comprising a top surface and a bottom surface, the tooth base being formed with at least an inclined guide groove extending from the top surface of the tooth base downwardly and inclinedly, the inclined guide groove having a first inclined surface, a second inclined surface and a bottom surface, the bottom surface of the inclined guide groove being located between the first and the second inclined surfaces;

a movable jaw, comprising a top wall and a plurality of side walls, the top wall and the side walls defining a tooth base receiving space, the tooth base being received in the tooth base receiving space;

wherein the side walls comprise a left side wall and a right side wall, at least one of the left and the right side walls being formed with a first through hole in communication with the tooth base receiving space;

at least a restriction element, penetrating the first through hole and moving between a first position and a second position along the inclined guide groove, the restriction element being received in the inclined guide groove and abutting against the first, the second inclined surfaces and the bottom surface when the restriction element is located in the first position so that the movable jaw is fixed on the tooth base, the restriction element being away from the inclined guide groove when the restriction element is located in the second position so that the movable jaw is removed from the tooth base.

2. The movable jaw quick release apparatus of the vice of claim 1, wherein the bottom surface of the inclined guide groove is a concave arc surface so that an inner contour of the inclined guide groove is U-shaped.

3. The movable jaw quick release apparatus of the vice of claim 1, wherein the inclined guide groove defines a first section and a second section, the first section extends from the top surface of the tooth base downwardly and inclinedly, the second section extends from a bottom end of the first section downwardly and inclinedly, a corner between the first and the second sections is a right angle so that the inclined guide groove is L-shaped.

4. The movable jaw quick release apparatus of the vice of claim 1, wherein the inclined guide groove defines a first section and a second section, the first section extends from the top surface of the tooth base downwardly and inclinedly, the second section extends from a bottom end of the first section downwardly and inclinedly, a corner between the first and the second sections is an obtuse angle so that the inclined guide groove is V-shaped.

5. The movable jaw quick release apparatus of the vice of claim 1, wherein the inclined guide groove defines a first section and a second section, the first section extends from the top surface of the tooth base downwardly and inclinedly, the second section extends from a bottom end of the first section downwardly and inclinedly, a corner between the first and the second section is an acute angle so that the inclined guide groove is V-shaped.

6. The movable jaw quick release apparatus of the vice of claim 1, wherein the restriction element is rod-shaped.

7. The movable jaw quick release apparatus of the vice of claim 1, wherein the restriction element is polygonal.

8. The movable jaw quick release apparatus of the vice of claim 1, wherein the movable jaw comprises a front side wall and a back side wall, the back side wall is formed with a second through hole in communication with the tooth base receiving space;

wherein the movable jaw quick release apparatus of the vice further comprises a positioning mechanism, the positioning mechanism comprises a fixed member, a resilient member and ball, the fixed member penetrates the second through hole and is formed with a receiving groove, the resilient member is received in the receiving groove, the ball is disposed at one end of the resilient member and tends to move toward the front side wall, the ball abuts against the tooth base when the restriction element moves between the first and the second positions.

* * * * *